(12) United States Patent
Jumel

(10) Patent No.: US 8,348,660 B2
(45) Date of Patent: Jan. 8, 2013

(54) STAMPING TOOLING FOR THERMOPLASTIC PARTS AND METHOD

(75) Inventor: Jean-Pierre Jumel, Croissy sur Seine (FR)

(73) Assignee: Daher Aerospace, St Julien de Chedon (FR)

( * ) Notice: Subject to any disclaimer, the term of this patent is extended or adjusted under 35 U.S.C. 154(b) by 184 days.

(21) Appl. No.: 12/662,557

(22) Filed: Apr. 22, 2010

(65) Prior Publication Data

US 2010/0270700 A1 Oct. 28, 2010

(30) Foreign Application Priority Data

Apr. 24, 2009 (FR) ...................................... 09 52687

(51) Int. Cl.
*B29C 51/18* (2006.01)
*B29C 51/26* (2006.01)
(52) U.S. Cl. ......... 425/521; 425/193; 425/398; 425/403
(58) Field of Classification Search ............... 425/450.1, 425/451.3, 451.6, 451.7, 451.9, 472, 190, 425/595, 193, 518–521, 397–398
See application file for complete search history.

(56) References Cited

U.S. PATENT DOCUMENTS

| | | | | |
|---|---|---|---|---|
| 3,632,276 A | * | 1/1972 | Munk | 425/415 |
| 4,637,789 A | * | 1/1987 | Netznik | 425/89 |
| 4,802,649 A | * | 2/1989 | Salazar | 249/21 |
| 7,862,326 B2 | * | 1/2011 | Wieder | 425/472 |
| 2010/0040720 A1 | * | 2/2010 | Nakagawa et al. | 425/149 |

* cited by examiner

*Primary Examiner* — Richard Crispino
*Assistant Examiner* — Thukhanh Nguyen
(74) *Attorney, Agent, or Firm* — Jacobson Holman PLLC

(57) ABSTRACT

A tooling for manufacturing by stamping parts made of thermoplastic material from a blank of the material. A hollow die is delimited by a bottom, side walls and an opening opposite the bottom, and a raised punch designed to cooperate with the die via the opening. The tooling includes at least one mobile element to cooperate with at least one recess placed in the bottom and/or side walls of the die, the recess allowing the passage of one part of the blank that is to be bent using the mobile element.

11 Claims, 4 Drawing Sheets

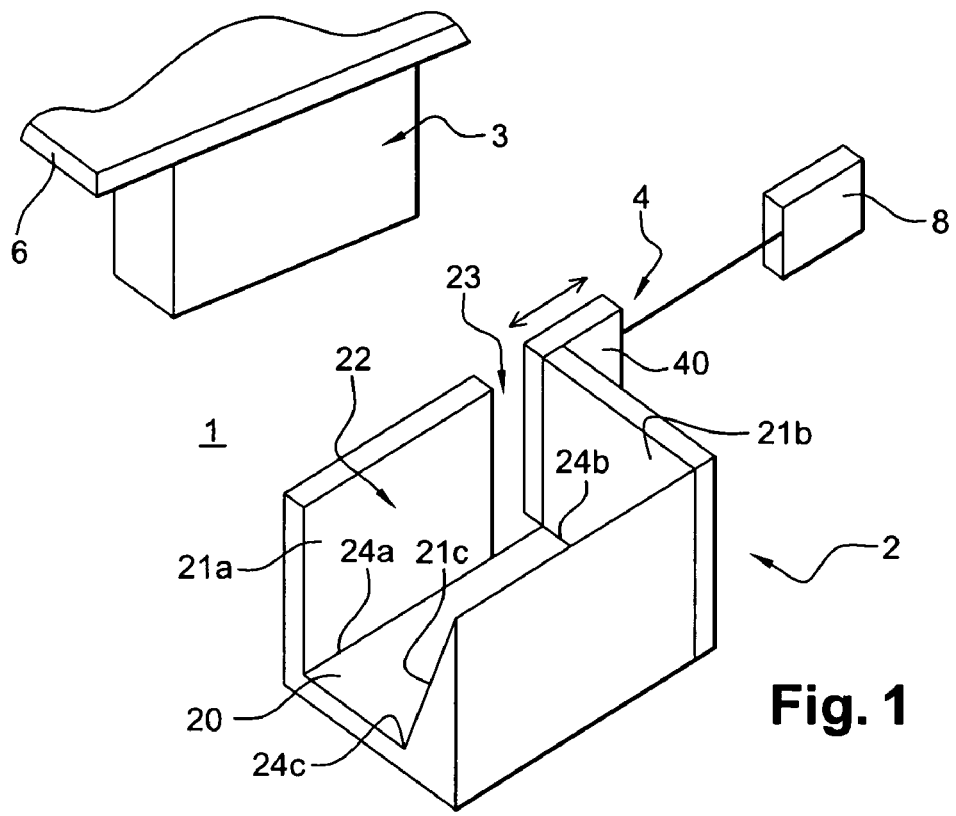
Fig. 1
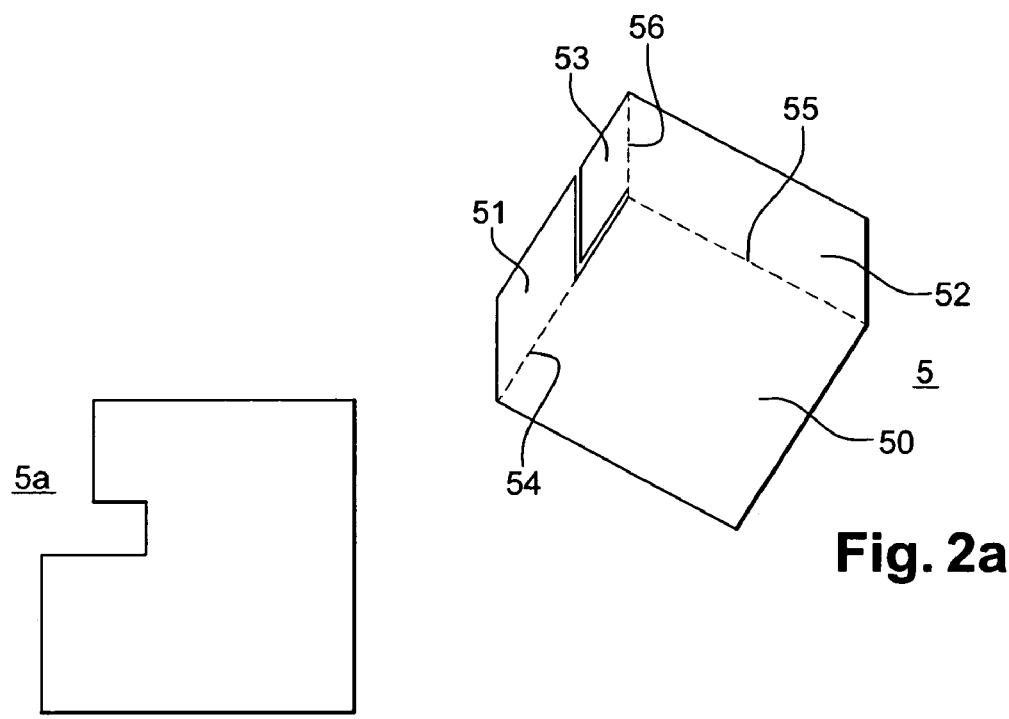
Fig. 2a
Fig. 2b

STAMPING TOOLING FOR THERMOPLASTIC PARTS AND METHOD

This is application has a priority of French no. 0952687 filed Apr. 24, 2009, hereby incorporated by reference.

The invention relates to tooling for forming by means of stamping parts made of thermoplastic material, particularly reinforced thermoplastic material, and a manufacturing method relating to the tooling.

The invention particularly relates to the manufacture of parts for the aeronautics industry but is not limited thereto.

Parts made of composite materials for aircraft building may be made from thermoplastic material and long reinforcing fibres. The parts cannot be formed by elongating the material because of the nature of the fibres, which are long. As a result, such forming is achieved by the method of bending a pre-cut and pre-heated composite material blank, using a heating stamping tool.

More precisely, it is known that the tooling for forming such parts comprises a hollow die and a raised punch with a shape complementary to the die and designed to be pushed in and pressed against the inside of the die. A blank of material is first heated, transferred between the die and the punch, then bent by making the punch meet the die (or vice versa), the final forming operation being carried out by pressing the punch against the die while leaving the thickness of material, and lastly by cooling and stripping.

In the usual way, a die forms a cavity with a shape that matches the external geometry of the part to be formed out of the blank.

The cavity for example has two adjacent walls joined by an edge in a way as to constitute a part of an angled type, comprising two adjacent surfaces extending from a single bending line.

Another example of cavity has different sides that include a bottom and side walls joined angularly to that bottom, the separating edges of the sides being designed to correspond with the bending lines that are to be formed in the blank to be shaped.

The part made in this way in a single stamping operation comprises a plurality of bending lines that correspond with the edges separating the different sides of the cavity.

However, it is impossible to make, concomitantly with these bending lines arranged along the edges of the cavity, that is to say at the intersection of two sides of the cavity, at least one bending line that is placed outside these edges and on at least one of these sides of the cavity.

Besides, depending on the type of bending required and the size of the blank, it may happen that part of the material extending along a plane or side of the cavity abuts against an adjacent side of the cavity, thus disturbing the bend or bends already initiated at the bottom of the die.

Thus, some parts cannot be made in a single pass operation in the tooling. For example, they are made in two stamping stages, a first stage involving the main forming operation of the part along certain bending lines, then a second stage involving the forming of the other bending lines. In another alternative embodiment, parts are designed in several pieces that are stamped separately and then assembled using fastening means such as rivets.

The drawback of such manufacturing is that it multiplies stamping or assembly operations.

The invention is thus aimed at simplifying the manufacturing method by stamping a part made from thermoplastic material using a plurality of bends, particularly at least three bends.

According to the invention, the tooling for manufacturing by means of stamping a part made of thermoplastic material from a blank of the same material comprises a hollow die delimited by a bottom, side walls and an opening opposite the bottom, and a raised punch designed to cooperate with the die through the opening and is characterised in that it comprises at least one mobile element adapted to create, in the die or the punch, at least one recess that is designed to be closed when the die and the punch cooperate.

The recess is placed in the bottom and/or side walls of the die or in the body of the punch.

Therefore, while in the usual way the opening of the die is designed to receive a blank that is to be formed according to a three-dimensional geometry thanks to the respective cavities on the inside of the die and the outside of the punch designed to be inserted and pressed against the inside of the said die, the recess created by the mobile element according to the invention and designed for example in the bottom or the walls of the die very advantageously makes it possible to provide a place for inserting part of the blank which would otherwise inopportunely abut against the inside of the cavity and would disrupt the bending of the blank. The mobile element makes it possible, when it is moved to close the recess, to suitably carry out the bending of this part of the blank and is designed to participate in forming it.

The recess may consist in a blind hole or a hole going through the thickness of the die or the punch. The volume of the recess is adapted to temporarily and sufficiently accommodate the part of the blank that is temporarily protruding from the rest of the general surface of the blank.

The tooling in the invention thus makes it possible to stamp a blank along several bending lines in a single operation, unlike the prior art, which necessitates several stages for the same type of part.

The part made in this way advantageously makes it possible to reduce material mass, which is highly appreciable in the field of aeronautics.

Further, it saves on material costs and production costs.

The die and the punch cooperate through the displacement of the one towards the other, the punch or the die being mobile, or both being mobile.

According to one feature, the mobile element is associated with the die or the punch.

According to another feature, the mobile element has a shape adapted to close the recess with which it cooperates, which makes it possible, after bending the part of the blank that has been inserted in the recess, to reconstruct the full shape of the cavity in order to fully push in the punch and apply it firmly against the cavity to compact the material.

The mobile element particularly comprises a contact surface with a shape adapted to the shape of the surface to be formed opposite the mobile element.

Advantageously, the tooling comprises locking means to lock the mobile element in place at the end of its travel in the recess. In that way, the mobile element is locked, preventing any risk of the accidental opening of the recess when the punch is pressed against the die.

According to another feature, the mobile element is controlled by the movement of the punch or die through mechanical or independent coupling.

According to an alternative mechanical coupling, the tooling comprises a support bearing the punch, the movement of which controls the movement of the punch, the said support comprising a thrust block designed to move the mobile element, the geometry of which is adapted to cooperate with the geometry of the mobile element in order to control the displacement speed of the said mobile element in relation to the displacement speed of the said punch.

Preferentially, the mobile element comprises an inclined side that is adapted to cooperate with a cut-off side of the thrust block, the slope of the cut-off side being complementary with the inclined side of the mobile element.

Thanks to its shape, the thrust block advantageously constitutes locking means to lock the mobile element when it reaches the end of its travel in the recess of the die.

According to another alternative mechanical coupling, the tooling comprises a fixed mechanical coupling block arranged at a distance from the mobile element and opposite the die, and designed to cooperate with a thrust block joined to the punch support and adapted to move in the support, the thrust block having two opposing cut-off sides with reverse slopes and designed to cooperate mutually with an inclined side of the mobile element and a bevelled profile of the fixed block respectively.

The fixed block and the thrust block advantageously constitute locking means to lock the mobile element at the end of its travel in the recess of the die.

The mobile element may rather be moved independently of the punch or die, the tooling comprising for that purpose an actuator that controls the movement and locking of the mobile element. The actuator is preferably controlled by electromechanical, electropneumatic or electrohydraulic means.

Besides, in order to transfer a blank to be stamped up to the die, the tooling advantageously comprises the use of a main heat-resistant film fixed to part of one of the sides of the blank, that side being designed to be opposite the bottom and/or at least one of the walls of the die, and the part associated with the film being that designed to cooperate with the bottom and/or wall or walls of the die, with the exception of the area corresponding with and surrounding the recess.

In that way, the film associated with the blank will not risk closing the recess and preventing the closing of the mobile element. Further, it will not interfere in the area of intersection of the bends corresponding with the area bringing together the recess, the wall adjacent to it and the bottom.

Advantageously, the tooling uses a secondary film on which the remaining part of the blank which is not associated with the main film is designed to lie without being secured thereto, so that the film helps transfer the blank up to the die, without then needing to be inserted, unnecessarily and inconveniently, into the die.

The invention also relates to a method of manufacturing by means of stamping parts made from thermoplastic material, particularly thermoplastic material reinforced for example by long or continuous fibres, woven or otherwise, using the tooling described above.

The method particularly comprises the following successive stages:

the flat positioning of a blank on the opening of the die,
the movement of the punch opposite the blank and towards the inside of the die or the movement of the die towards the punch so as to form bends in the blank,
the temporary holding of part of the blank through the recess of the tooling,
the movement of the mobile element concomitantly with the movement of the punch or die to form at least one additional bend,
the closing of the recess by positioning the mobile element at the end of its travel, preferentially in the locked state, and
the pressing of the punch against the die.

In that way, the method of the invention makes it possible by creating a recess in the tooling to temporarily store part of the blank to be stamped while the first bends are initiated, then by moving the mobile element to bend the part stored earlier and lastly by closing the recess to reproduce the totality of the die to allow pressing the punch during the final stamping stage.

The kinetics of the mobile element are controlled by the movement of the punch or the die, independently or via the mechanical coupling of the mobile element with the punch or the die respectively.

This invention will now be described with reference to examples that are only illustrative and in no way limitative of the scope of the invention, on the basis of the attached drawings, wherein:

FIG. 1 represents a schematic view of tooling according to the invention;

FIG. 2a illustrates an example of part formed using the tooling on FIG. 1;

FIG. 2b is a blank from which the part on FIG. 2a is made;

Figure 6A:
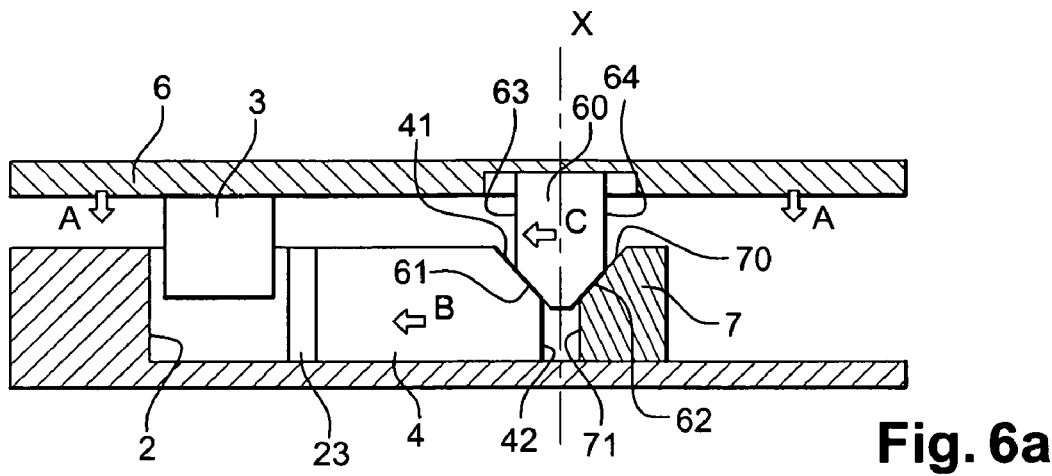
Figure 6B:
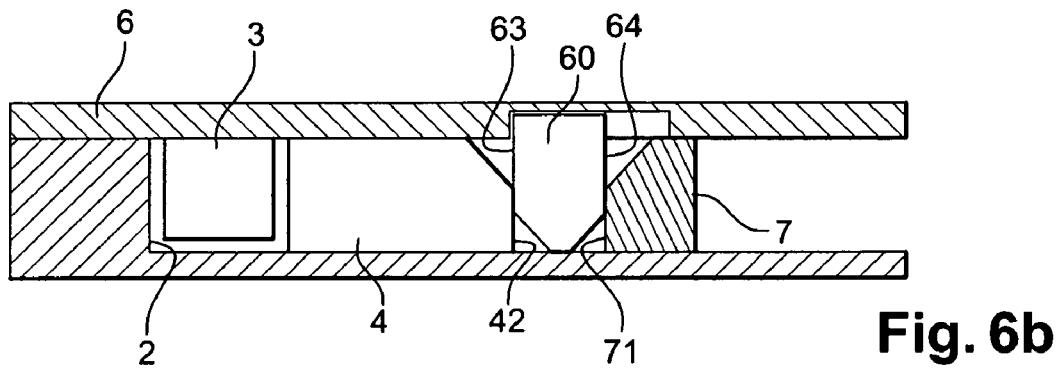
Figure 7:
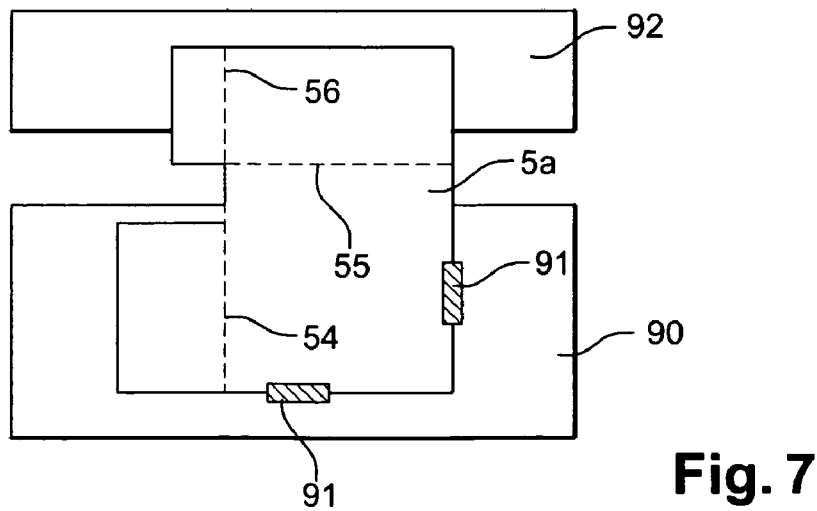

FIGS. 5a to 5d schematically illustrate stages of the stamping method according to an alternative embodiment of the tooling;

FIGS. 6a and 6b schematically illustrate two stages of the stamping method according to another alternative embodiment of the tooling;

FIG. 7 is a schematic top view of a blank before it is transferred for stamping.

FIG. 1 illustrates tooling 1 for making by means of stamping a part made of composite material, particularly at least one thermoplastic material and long reinforcing fibres such as fibreglass or carbon fibres.

A schematic example of a part 5 is shown on FIG. 2a, the part being made with the tooling of the invention from a flat blank 5a shown on FIG. 2b.

As can be seen on FIG. 1, tooling 1 comprises a hollow die 2, a mobile punch 3 that is adapted to follow the inner cavity of the die, and according to the invention, another mobile element 4 designed to cooperate with the die.

The tooling thus makes it possible to form the part 5 from a flat blank. The die 2 and the punch 3 and possibly the mobile element 4 are of the heating type to give the material its mechanical properties. The blank is designed to be caught between the die and the punch. It is bent and formed by applying the punch against the die.

The die 2 forms a cavity delimited by a bottom 20, side walls, here for instance which are three in number such as 21a, 21b and 21c, and an opening 22 designed to be closed by the punch 3 while sandwiching the blank of material to be formed. The demarcations between the bottom 20 and the side walls 21a, 21b, 21c are formed by edges 24a, 24b, 24c of the cavity respectively.

According to the invention, the die further comprises at least one recess made in the bottom and/or one of the side walls, through which the mobile element 4 is adapted to be moved in or against the cavity of the die.

According to the invention, the recess is created by the mobile element when it is away from the die. When it cooperates with the die, it is designed to close the recess, making the die walls full again, so that the punch can press against them to finalise the stamping process.

In the example of embodiment that can be seen on FIG. 1, the recess 23 is placed in the angle of wall 21a and adjacently to wall 21b. The mobile element 4 is designed to close the recess 23 to reconstruct a full surface that extends wall 21a in its plane up to side wall 21b, transversal to wall 21a.

The punch 3 is designed to be inserted in the cavity through the opening 22. It has an exterior shape complementary to the interior shape of the cavity in order to follow and press against the entire geometry of the cavity. It is preferably integral with a support 6 adapted to be moved.

Part 5 is thus obtained through tooling 1 by bending the flat blank on FIG. 2b. That part 5, as shown on FIG. 2a, comprises a plurality of facets such as 50 to 53 and bending lines illustrated in dotted lines, 54 to 56.

Figure 3:
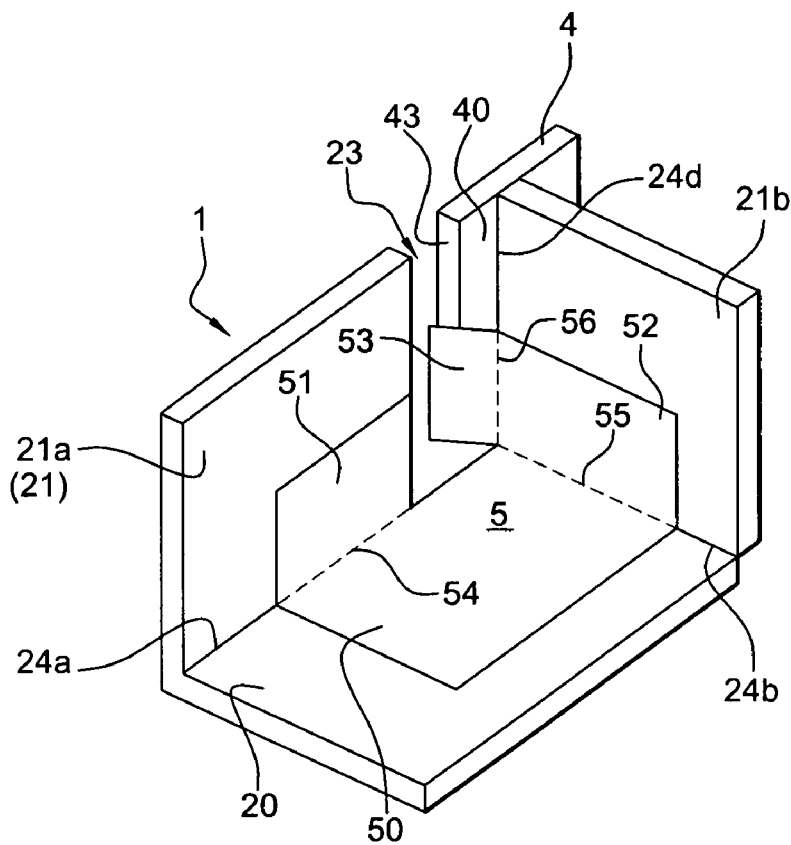
FIGS. 3 and 4 are partial schematic perspective views of the inside of the die while the part is being formed in two distinct stages of the manufacturing method.

FIG. 3 shows the part 5 when it is being formed in the cavity of the die, one of the walls (21c) of the die and the punch 3 not being shown for better understanding. The bottom 20 and the adjacent side walls 21a and 21b of the cavity make it possible to make facets 50, 51 and 52 of the part respectively, whereas the edges 24a and 24b make the bending lines 54 and 55 respectively, common to facets 50 and 51, and 50 and 52 respectively.

The facet 53 of the part and the bending line 56 are made thanks to mobile element 4, the facet 53 being before it is bent co-planar with facet 52 and advantageously accommodated in the recess 23. The displacement of the mobile element 4 during the stamping method gives rise, as can be seen on FIG. 3, to the pressing of the said mobile element against the facet 53 and bending along the line 56 corresponding with the intersection line 24d of the wall 21b of the cavity with the said mobile element.

The final forming of all the facets, including facet 53, is achieved when the mobile element moves to the end of its travel against wall 21a and closes recess 23, along with the compression of the punch against the bottom and sides of the die.

The cavity of the die here is substantially shaped like a parallelepiped to give the part 5 facets that are square and/or rectangular in shape. Of course, the profile of the cavity (number of walls, their angular inclination, relief etc.) is adapted to the geometry required of the final part.

The recess 23 is placed at an appropriate location in the cavity to prevent any part of the blank that cannot immediately follow the whole profile of the cavity from abutting, and on the contrary to allow that part of the blank to escape outside the cavity in order to suitably bend and form it.

The recess 23 of the die is preferentially made on the edge of a wall or the bottom in order to give the blank a transverse bend or at least one that is angularly directed, while extending along the intersection of two planes that already have a respective bend with another shared plane.

Figure 4:
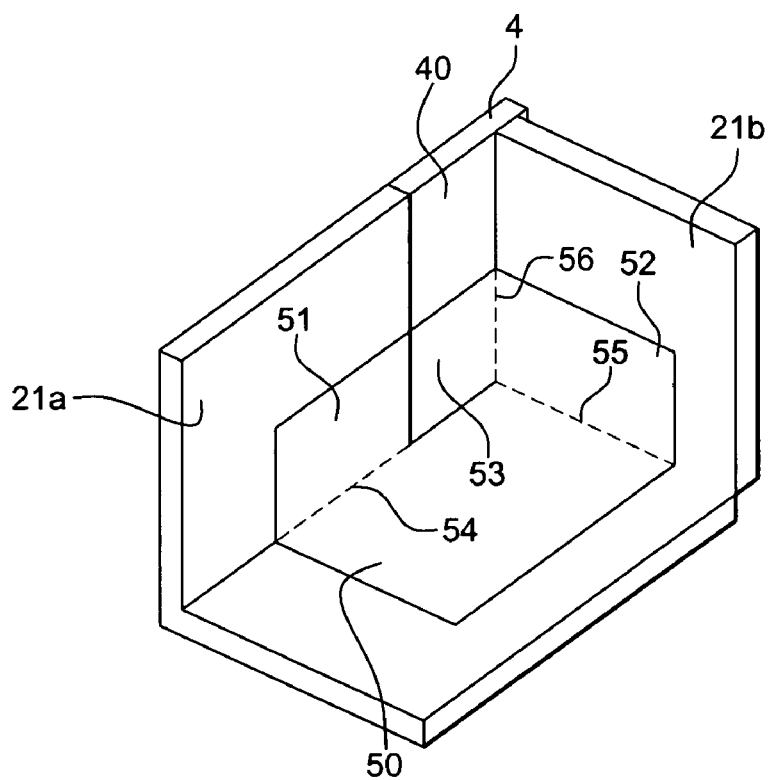

The mobile element 4 is designed to close the recess 23. The surface 40 of the mobile element (FIG. 4) designed to be placed opposite the inside of the die is designed to correspond with the cutting lines of the recess.

The surface 40 preferentially has an area greater than that of the facet 53 of the blank which is designed to rest against it. According to the invention, that surface 40 is further adapted to the shape that is to be given to facet 53.

The surface 40 is designed to be co-planar with the wall 21a of the cavity. It may however be substantially offset (protruding or recessed in relation to the cavity) to make up for angular variation after cooling between the facets of the part that are not joined to each other (spring back effect).

The shape of the mobile element in this example of embodiment is substantially a parallelepiped and has a contact edge 43 (FIG. 3), designed to rest against the blank to form the bend of the rectangular facet 53, extending in a plane transversal to the direction of movement of the mobile element.

The mobile element 4 thus completes the wall 21a to reconstruct the totality of the die in terms of tightness and rigidity so that the die can withstand the pressure required for finalising the stamping operation using the punch.

When the punch is pressed, it is imperative that the mobile element 4 stays immobile and cannot move so that the material is compacted against a rigid and full surface. At least one means to lock the mobile element at the end of its travel is advantageously provided.

The mobile element 4 is either controlled by the movement of the punch 3 by mechanical coupling or controlled independently by an actuator 8 such as that visible on FIG. 1.

The kinetics of the mobile element and punch according to the method of the invention will now be described with respect of FIGS. 5a to 5d. These figures further show tooling with mechanical coupling between the mobile element and the punch.

Figure 5A:
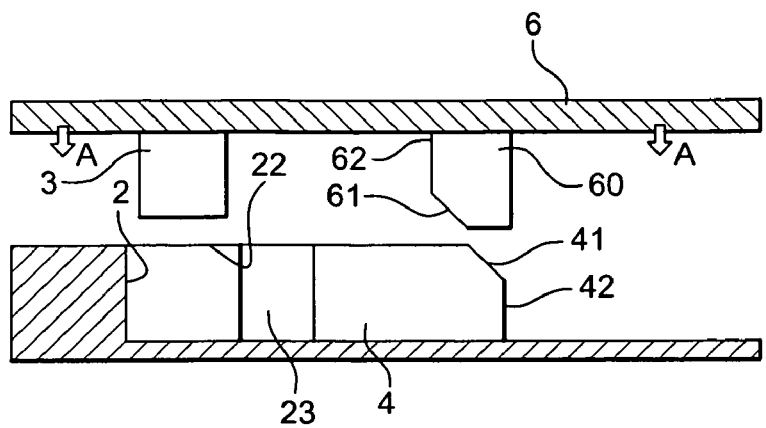
Figure 5B:
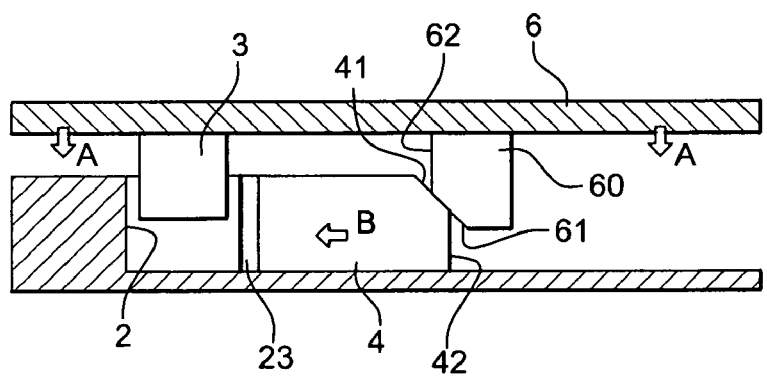
Figure 5C:
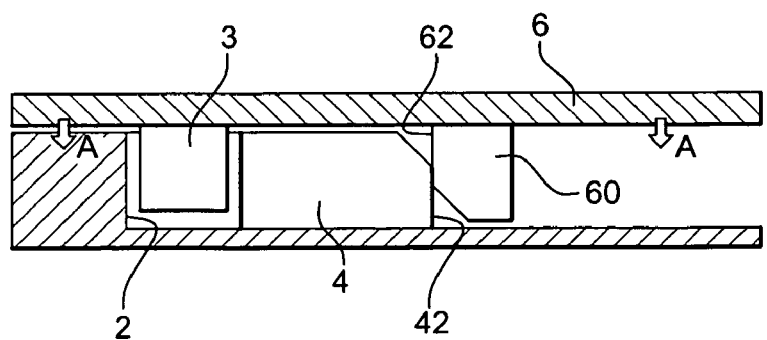
Figure 5D:
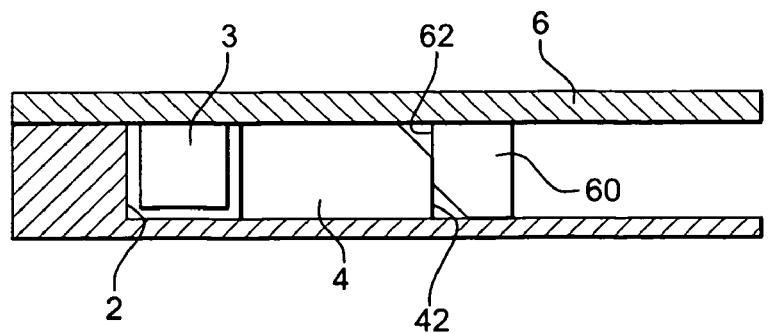

FIG. 5a: the pre-heated blank of material (not illustrated) is set against the opening of the die; its transfer up to the die will be detailed below. The stage on this figure corresponds with the initiation of the movement of the punch 3 towards the cavity of the die 2 along arrows A, showing the closing movement between the support 6 of the punch 3 and die 2, while the mobile element 4 remains immobile, away from the die;

FIG. 5b: the punch 3 brought in contact with the blank descends in the die 2 initiating the bending of the blank towards the bottom and walls of the die, while the mobile element 4 starts its displacement along arrow B and is inserted in the recess 23 of the die in order to start bending facet 53 of the part;

FIG. 5c: the mobile element 4 fully closes the recess 23 and its movement is locked, whilst the punch 3 has not yet arrived at the limit of its travel. All the facets and bends of the blank are completed at this stage;

FIG. 5d: the stamping is finalised by compacting the material by pressing the punch against the cavity of the die.

In this alternative mechanical coupling between the punch and the mobile element, the punch 3 is integral with a support 6 adapted to be displaced in a translational motion. The support 6 further comprises a thrust block 60 with a cut-off side 61 that is designed to cooperate with the rear part of the mobile element 4 (opposite the die) to displace it.

At the end opposite that turned towards the die, the mobile element 4 has an inclined side 41 with a slope opposed to that of the cut-off side 61 of the block 60. When the block 60 meets the mobile element 4, the said block 60 applies a thrust force against the mobile element by applying its cut-off side 61 against the inclined side 41 with a complementary slope, the movement speed of the mobile element being imposed by the slope given to the cut-off side and the inclined side.

The inclined side 41, like the cut-off side 61 which continues in the direction of the support 6 through a break profile 62, only extend over a certain length equal to the distance to be covered by the mobile element. When the cut-off side 61 is no longer in contact with the inclined side 41 (FIG. 5c), the mobile element arrives at the end of its travel and fully closes the recess 23.

Further, the mobile element ends in its end opposite the recess, with a profile 42 extending transversal to the movement direction of the mobile element. That profile 42 presses against the break profile 62 of the block 60, their cooperation constituting a means of locking the mobile element 4 which then abuts against block 60 and can no longer move back.

FIGS. 6a and 6b illustrate another alternative mechanical coupling between the punch and the die. The tooling comprises the thrust block 60 of the previous alternative, this block being further adapted to be displaced in a translational motion in the support 6 along the arrow C. It also comprises a fixed block 7 arranged at a distance from the mobile element.

The thrust block 60 is designed to slide between the mobile element and the fixed block by being displaced along arrows A and C, displacing the mobile element in translation towards the die along arrow B.

The thrust block 60 advantageously comprises, symmetrical to an axis X parallel to the displacement of the support 6 (along arrow A), two straight sides 63 and 64 extending from the support 6 and at its end opposite that associated with the support, two opposite inclined sides 61 and 62 with reverse slopes that converge towards axis X.

The mobile element 4 has, as in the previous alternative, an inclined side 41 and a transverse end profile 42.

The fixed block 7 has a bevelled profile 70 opposite the mobile element, with a reverse slope in relation to the inclined side 41 of the said mobile element. The bevelled profile 70 is extended abruptly by a profile 71 that is parallel to the profile 42 of the mobile element.

With respect to the FIG. 6a, the block 60 by displacement along arrow A abuts firstly against the block 7 by the cooperation of surfaces 62 and 70, and secondly against the mobile element 4 via surfaces 61 and 41. Besides, the displacement of the block 60 along arrow C makes it possible to add up the displacements induced by the two reaction forces that are generated by the contact of the block 60 against the block 7 and the contact of the block 60 against the mobile element 4 respectively. In that way, the bevelled profile 70 advantageously constitutes a second guiding slope for the block 60 making it possible to increase the movement speed of the mobile element in relation to the speed obtained in the previous alternative.

With regard to FIG. 6b, when the cooperation of inclined sides 61 and 62 with the inclined side 41 and the bevelled profile 70 respectively is completed, the mobile element reaches the end of its travel and the block 60 is blocked by the fixed block 7. The cooperation of the profile 42 of the mobile element and the side 63 of the block 60, and the side 64 of the block 60 and the profile 71 of the fixed block 7 thus constitutes a means of locking the displacement of the mobile element.

In yet another alternative, the displacement of the mobile element 4 is not mechanically coupled with that of the punch 3 but is controlled independently as illustrated schematically on FIG. 1 by the actuator 8. That actuator is for example controlled by electropneumatic, electromechanical or electrohydraulic means. The actuator is controlled in relation with the closing of the die and punch assembly.

Lastly, the transfer of the blank up to the die is described below.

In the usual way, the blank is first heated before it is moved up to the gap between die and punch. In particular, two methods of transfer are commonly used. One of them consists in using a frame that supports the blank up to the opening of the die and then detaching the frame and dropping the blank in the die. The other method is to transfer the blank on support film.

In the latter method, the blank is transferred up to the die by means of heat-resistant film, such as polyimide film, placed under the blank and secured thereto with heat-resistant adhesive. After stamping the blank with the film on its rear side, the film is taken off the part after the part is extracted from the die.

However, the invention offers a specific solution as to the manner in which such film can be used with a blank to be folded. That is because the tooling of the invention poses the following difficulties:

If the film covers the rear surface of the blank entirely, it would close the recess 23 and prevent the insertion of the mobile element;

In the area near the intersection of bends 54, 55 and 56, the film will tend to be creased and break randomly to accompany the bending of the blank, leading to visible marks on the rear surface of the part once it is completed.

That is why the solution of the invention consists in supplying several pieces of film instead of only one, each piece of film being subjected to a minimum number of bends, ideally only one.

FIG. 7 illustrates the association of two pieces of film with blank 5a. For better understanding of the location of the pieces of film in respect of their cooperation with the die, the bends 54 to 56 that are to be made have also been drawn.

A main film 90 is applied and secured by adhesive means 91 on the large rear part of the blank corresponding to facets 50 and 51 to be formed. The film accompanying the stamping does not pose any problem, as it only covers a zone with a single bend (bend 54), and does not interfere with the recess of the die.

A secondary piece of film 92 supports the other part of the blank designed to form facets 52 and 53 without being secured thereto. During stamping, this part of the blank slides in the opening 22 along the wall 21b of the die, whilst the piece of film 92 which is not secured remains outside the die. The secondary piece of film 92 thus does not produce any interference in the tooling.

The invention claimed is:

1. A tooling for manufacturing by stamping along several bending lines, a part from a flat blank made of a thermoplastic material reinforced with continuous fibers, said tooling comprising
    a hollow die delimited by a bottom, side walls and an opening opposite the bottom, and
    a raised punch cooperating with the die through the opening,
    at least one recess in the die or the punch, and
    at least one mobile element adapted to close the recess through a travel movement of said mobile element during cooperation of the die and the punch, said travel movement forming a bend of the blank.

2. The tooling according to claim 1, wherein the mobile element has a contact surface with a shape that is adapted to a shape of a surface of the part to be formed opposite the mobile element.

3. The tooling according to claim 1, further comprising locking means to lock the mobile element in place at an end of its travel.

4. The tooling according to claim 1, wherein movement of the mobile element is controlled by movement of the punch or the die by mechanical or independent coupling.

5. The tooling according to claim 4, further comprising a support bearing the punch, movement of the support controls the movement of the punch, said support includes a thrust block designed to move the mobile element and having geometry that is adapted to cooperate with geometry of the mobile element to control movement speed of the mobile element in relation with movement speed of the punch.

6. The tooling according to claim 5, wherein the mobile element includes an inclined side adapted to cooperate with a cut-off side of the thrust block, the cut-off side having a slope complementary to the inclined side.

7. The tooling according to claim 5, further comprising a fixed mechanical coupling block arranged at a distance from the mobile element and opposite the die, and designed to cooperate with the thrust block adapted to move in the support, the thrust block having two opposed cut-off sides with reverse slopes that are designed to cooperate mutually with an inclined side of the mobile element and a bevelled profile of the fixed block respectively.

8. The tooling according to claim 7, wherein the fixed block and the thrust block constitute locking means to lock the mobile element when it reaches an end of its travel.

9. The tooling according to claim 3, further comprising an actuator that controls movement and locking of the mobile element independently from the movement of the punch or the die, the actuator being controlled by electromechanical, electropneumatic or electrohydraulic means.

10. The tooling according to claim 1, further comprising a main heat-resistant film secured to the blank and extending over a surface of the blank excluding a part of the blank bent by the mobile element during stamping.

11. The tooling according to claim 10, further comprising a secondary piece of heat-resistant film outside of the main film separate from the blank.

\* \* \* \* \*